United States Patent
Zou et al.

(10) Patent No.: US 12,487,626 B1
(45) Date of Patent: Dec. 2, 2025

(54) HIGH PRECISION ANALOG OPTICAL COMPUTING METHOD AND SYSTEM BASED ON BIT SLICE

(71) Applicant: Shanghai Jiao Tong University, Shanghai (CN)

(72) Inventors: Weiwen Zou, Shanghai (CN); Sicheng Yi, Shanghai (CN); Yuting Chen, Shanghai (CN); Shaoyang Zhang, Shanghai (CN); Shaofu Xu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 19/201,747

(22) Filed: May 7, 2025

(30) Foreign Application Priority Data

Feb. 10, 2025 (CN) .......................... 202510142467.8

(51) Int. Cl.
*G06E 3/00* (2006.01)
*G06E 1/04* (2006.01)

(52) U.S. Cl.
CPC ............. *G06E 3/005* (2013.01); *G06E 1/045* (2013.01)

(58) Field of Classification Search
CPC ......... G06E 3/001; G06E 3/003; G06E 3/005; G06E 3/008; G06E 1/04; G06E 1/045
(Continued)

(56) References Cited

U.S. PATENT DOCUMENTS

2018/0373902 A1* 12/2018 Muralimanohar ..... G11C 13/00
2020/0142441 A1* 5/2020 Bunandar ............... G06E 3/008
(Continued)

FOREIGN PATENT DOCUMENTS

CN 111340680 A 6/2020
CN 115564037 A 1/2023
(Continued)

OTHER PUBLICATIONS

X. Xu, et al., "11 Tops photonic convolutional accelerator for optical neural networks," Nature, vol. 589, pp. 44-51 (Jan. 2021).
(Continued)

*Primary Examiner* — Matthew D Sandifer
(74) *Attorney, Agent, or Firm* — Mei & Mark LLP; Manni Li

(57) ABSTRACT

A high-precision analog optical computing method and system based on bit slicing comprises decomposing high-precision signals into low-precision signal segments, decomposing high-precision weights into multiple low-precision weight segments, performing low-precision signal and weight multiplication operations in the optical domain respectively, and finally combining these low-precision calculation results to restore high-precision output. By splitting high-precision data into multiple low-precision bit slices for processing, it takes advantage of high-speed parallel characteristics of photonic computing to simultaneously handle multiple input bit slices and weight bit slices, improves computational efficiency of large-scale computing tasks and reduces the hardware requirements for optical computing. By adjusting values of M and N, it flexibly adapts to computing tasks of different scales and precisions, demonstrating strong adaptability and flexibility. It achieves balance between computational accuracy and hardware complexity, and fully exploits parallel processing advantages of photons, providing solutions for large-scale data processing and efficient optical domain computing.

7 Claims, 4 Drawing Sheets

(58) Field of Classification Search
USPC .......................................................... 708/816
See application file for complete search history.

(56) References Cited

U.S. PATENT DOCUMENTS

| | | | |
|---|---|---|---|
| 2020/0150923 A1* | 5/2020 | Muralimanohar | .... G06F 7/5443 |
| 2020/0259687 A1 | 8/2020 | Klemmer et al. | |
| 2022/0012013 A1* | 1/2022 | Sebastian | ................ G06E 3/003 |
| 2023/0152667 A1* | 5/2023 | Miscuglio | ............... G06E 3/003 |
| | | | 359/107 |

FOREIGN PATENT DOCUMENTS

| | | |
|---|---|---|
| CN | 116339444 A | 6/2023 |
| CN | 118713820 A | 9/2024 |

OTHER PUBLICATIONS

T. Wang, et al., "An optical neural network using less than 1 photon per multiplication," Nature Communications, 13:123, pp. 1-8 (2022).
W. Zhang, et al., "Broadband physical layer cognitive radio with an integrated photonic processor for blind source separation," Nature Communications, 14:1107, pp. 1-10 (Feb. 2023).
B. Bai, et al., "Microcomb-based integrated photonic processing unit," Nature Communications, 14:66, pp. 1-10 (Jan. 2023).

* cited by examiner

HIGH PRECISION ANALOG OPTICAL COMPUTING METHOD AND SYSTEM BASED ON BIT SLICE

CROSS-REFERENCE TO RELATED APPLICATION

The subject application claims priority on Chinese Patent Application No. CN202510142467.8 filed on Feb. 10, 2025 in China. The contents and subject matters of the Chinese priority application are incorporated herein by reference.

TECHNICAL FIELD

The present invention relates to optical computation, in particular to a high-precision analog optical computation method and system based on bit slicing.

BACKGROUND ART

Light computing is a new technology that uses light as an information carrier and realizes calculation through the physical characteristics of light. Its core principle depends on the characteristics of light wave propagation, interference, diffraction and refraction. Unlike traditional electronic computers which rely on the flow of electrons to perform logical operations in semiconductors, light computing performs similar operations through the behavior of photons. The basic units of light computation comprise optical devices such as optical crystals, waveguides, modulators and lasers, which achieve data transmission and logical operations by manipulating the phase, amplitude, polarization and wavelength of light. At the same time, with its unique parallelization advantage, optical computing can realize the simultaneous computation of multi-channel radar through time multiplexing, space multiplexing, wavelength multiplexing, mode multiplexing and so on.

In recent years, a good research foundation has been formed in the field of optical computing technology at home and abroad, and the advantages of high throughput and low delay of optical processing methods have been preliminarily verified. Among them, Wiburne University uses optical frequency comb as the light source and adopts the optical dispersion principle to realize ultra-high speed optical convolution calculation. Clock frequency up to 62.9 GHZ (X. Xu, et al., "11 TOPS photonic convolutional accelerator for optical neural networks," Nature 589, 44-51 (2021)). Cornell University used spatial light modulators to build large-scale neural networks, It is proved that less than one photon energy is needed to complete a multiplication (T. Wang, et al., "An optical neural network using less than 1 photon per multiplication," Nat. Commun. 13, 123 (2022)).

However, although optical computing has achieved preliminary verification on individual performance, it still faces challenges to further improve its practical application performance. Among them, optical link insertion loss, environmental interference and active noise are the main reasons that lead to the decrease of optical calculation accuracy. These problems not only affect the stability and reliability of optical computing but also limit its application in more fields.

At present, the research on the improvement of optical computation accuracy mainly focuses on the control of weight accuracy. Aiming at the problems of high sensitivity and limited weight accuracy of microring resonators, the research team of Princeton University proposed the use of feedforward and feedback methods to realize microring resonance locking and continuous weight configuration control and achieved 9-bit microring control accuracy. The successful development of A high-precision control scheme for a microring resonator can be extended to large optical computing networks (W. Zhang, A. et al., "Broadband physical layer cognitive radio with an integrated photonic processor for blind source separation," Nat. Commun. 14, 1107 (2023)). The research team of Peking University has also conquered the calibration and ultra-precision weight loading of multi-wavelength parallel optical computing systems, and the calibration method developed for multi-wavelength computing systems can achieve accurate control of various parts of the optoelectronic devices. The 9 bit weight control precision was realized (B. Bai, et al., "Microcomb-based integrated photonic processing unit," Nat. Commun. 14, 66 (2023)).

However, although these methods improve the accuracy of optical calculation to a certain extent, they do not fundamentally solve the problem of improving the final calculation accuracy. Especially for the simulation light calculation, the optimization effect of the final calculation result is not obvious. When dealing with complex tasks, the accuracy and stability of analog optical computation are often restricted by many factors, such as nonlinear effects, optical loss and error accumulation, so a comprehensive scheme is needed to improve the final calculation accuracy to achieve high precision analog optical computation.

SUMMARY OF THE INVENTION

Aiming at the shortcomings of the existing technology, the present invention provides a high-precision analog light calculation method and system based on bit slicing. In the present invention, firstly, the input signal and the weight signal are decomposed by bit slice according to their accuracy requirements to generate multiple signal combinations with low bit accuracy. Secondly, these low bit precision signals and weights are calculated independently by using analog optical computing technology. Thirdly, multiple low-precision calculation results are added and combined according to weights to generate high-precision matrix multiplication or convolution calculation results.

The technical solution of the present invention is as follows:

One aspect of the present invention is to provide a high-precision analog light calculation method based on bit slicing, which is characterized in that it comprises the following steps:

S1. The input signal and the weight signal are decomposed by bit slice according to the predetermined accuracy requirements respectively to generate multiple signal combinations with low bit accuracy, wherein each signal combination with low bit accuracy contains part of the input signal or weight signal;

S2. Using analog optical computing technology, each low-bit precision signal combination generated in step S1 and the corresponding low-bit precision weight signal are independently calculated, and multiple low-precision calculation results are obtained;

S3. Multiple low-precision calculation results obtained in step S2 are added and combined according to predetermined weights to generate high-precision matrix multiplication or convolution calculation results.

Further, the bit slice decomposition described in Step S1 is the decomposition of the input signal and the weight signal into multiple bits of binary bits respectively, the number of bits of each bit fragment is determined according to the desired computational precision.

Furthermore, the input bit slice reconstruction module splits the high-precision input data stream with word length of K bit into M low-precision input bit slices with word length of K/M bit, where K is a positive integer multiple of M, and M is a positive integer $\geq 2$.

The high-precision weight with word length L bit is split into N low-precision weight bit slices with word length L/N bit through the weight bit slice reconstruction module, and M copies of the output are copied, where L is a positive integer multiple of N and N is a positive integer $\geq 2$.

Further, the input bit slice reconstruction module comprises an electrical input port, M optical output ports and M electro-optical converters, which convert the electrical signals of M low precision input bit slices into optical signals and then output them.

Further, the weight bit slice reconstruction module comprises an electrical input port and M×N electrical output ports, and the M×N electrical output ports output M copies of the low-precision weight bit slice.

Further, the present invention comprises the photon computing core module, which has M optical input ports, M×N electrical input ports, M×N electrical output ports, M×N weight regulator and M×N photodetectors, is used for dot product calculation of M×N low precision input bit slices and M×N low precision weight bit slices and converts the calculation results into electrical signal output through the photodetector.

The output bit slice combination module has M×N electrical input ports and an electrical output port for summing M×N low-precision calculation results by corresponding weights to obtain a high-precision calculation result and output it through an electrical output port.

The second aspect of the present invention is to provide a high-precision analog optical computing system based on bit slices, which is characterized in the following aspects:

The input bit slice reconstruction module has an electrical input port, M optical output ports, M electro-optical converters, M is a positive integer $\geq 2$; The high-precision input data with a word length of K bit is input through the electrical input port and is divided into M low-precision input bits with a word length of K/M bit by reconstruction. After M electrical signals are converted into optical signals by an electro-optical converter, the output is to the photon computing core module, where K is a positive integer multiple of M.

The weight bit slice reconstruction module has an electrical input port, M×N electrical output ports, N is a positive integer $\geq 2$; The high-precision weight with L bit word length is input through the electrical input port, and is divided into N low-precision weight bit slices with L/N bit word length by reconstruction, and copied M copies and output to the photon computing core module, where L is a positive integer multiple of N.

The photon computing core module has M optical input ports connected with M optical output ports of the input bit slice reconstruction module, M×N electrical input ports, M×N electrical output ports, M×N weight regulator and M×N photodetectors connected with the weight bit slice reconstruction module; The M×N weight bit slices are loaded onto the high parallel photon computing core by the M×N weight regulator, and the M×N output bit slices are computed with the M×N input bit slices to obtain the M×N output bit slice results, which are converted into electrical signals by the M×n photodetectors respectively, and transmitted as output bit slices to the output bit slice combination module.

The output bit slice combination module has an M×N electrical input port and an electrical output port connected with an M×N electrical output port of the photon computing core module; Each input bit slice and each weight bit slice will calculate an output bit slice result, numbered (m, n), that is, the result calculated by the MTH input bit slice and the NTH weight bit slice, where $1 \leq m \leq M$, $1 \leq n \leq N$. The output bit slices numbered (m, n) are multiplied by the corresponding weight factor $2^{(M-m)K/M+(N-n)L/N}$ and then M×N output bits are summed to obtain a high-precision calculation result and output through an electrical output port.

Further, the electro-optical converter in the input bit slice reconstruction module is a coherent modulator, which works in zero bias mode and linearly modulates the input electrical signal to the optical amplitude, and the value of the signal is represented by the amplitude value of the light.

Further, the reconstruction modes in the input bit slice reconstruction module and the weight bit slice reconstruction module are realized by single chip microcomputer or digital computer.

Further, the photon computing core module adopts on-chip coherent light computing architecture, on-chip incoherent light computing architecture and spatial diffractive light computing architecture. Or use different time, different space, different mode, different wavelength to realize the calculation of different signals and weights.

Further, the photon computing core module can be used to include but not limited to on-chip coherent light computing architecture, on-chip incoherent light computing architecture, and spatial diffraction light computing architecture. It is also possible to use, including but not limited to, the same optical computing architecture at different points in time, or spatially different optical computing architectures.

Further, the weight regulator in the photon computing core module can use photonic devices including but not limited to microrings, phase shifters, phase change materials, spatial light modulators, etc., which have an adjustment effect on the optical field amplitude.

Compared with the existing technology, the present invention has the following technical advantages:

(1) Compared with the traditional optical computing architecture, the present invention adopts a bit slice optical computing mode, which enables the low-precision optical computing device to realize the task of high-precision optical computing, greatly expands the application range of optical computing, provides a new solution for processing in complex scenes, and breaks the limitations faced by the traditional optical computing architecture in processing high-precision data.

(2) The present invention can make full use of the existing low-precision computing system resources to carry out high-precision calculation, reduce the requirements for the integration and packaging of the optical computing system, make the present invention easier to integrate and upgrade with the existing system, and provide convenience for the popularization and application of optical computing technology.

(3) The present invention realizes high-precision analog light calculation through the reconstruction of input and weight, the efficient dot product calculation in the photon calculation core and the shift addition and combination of output results, which not only improves the accuracy and efficiency of calculation but also makes full use of the advantages of parallel processing of photons, providing a promising solution for large-scale data processing.

(4) By splitting high-precision data into multiple low-precision bit slices for processing, the present invention utilizes the high-speed parallel characteristics of photon computing to process multiple input bit slices and weight bit slices at the same time and significantly improves the computing efficiency of large-scale computing tasks. In addition, by adjusting the values of M and N, it can flexibly adapt to calculation tasks of different scales and precision, with strong adaptability and flexibility.

DETAILED DESCRIPTION OF THE INVENTION

The present invention is described in detail in combination with the attached drawings and following embodiments. Detailed embodiments and structure are given below, but the scope of protection of the present invention is not limited to the following embodiments.

Figure 1:
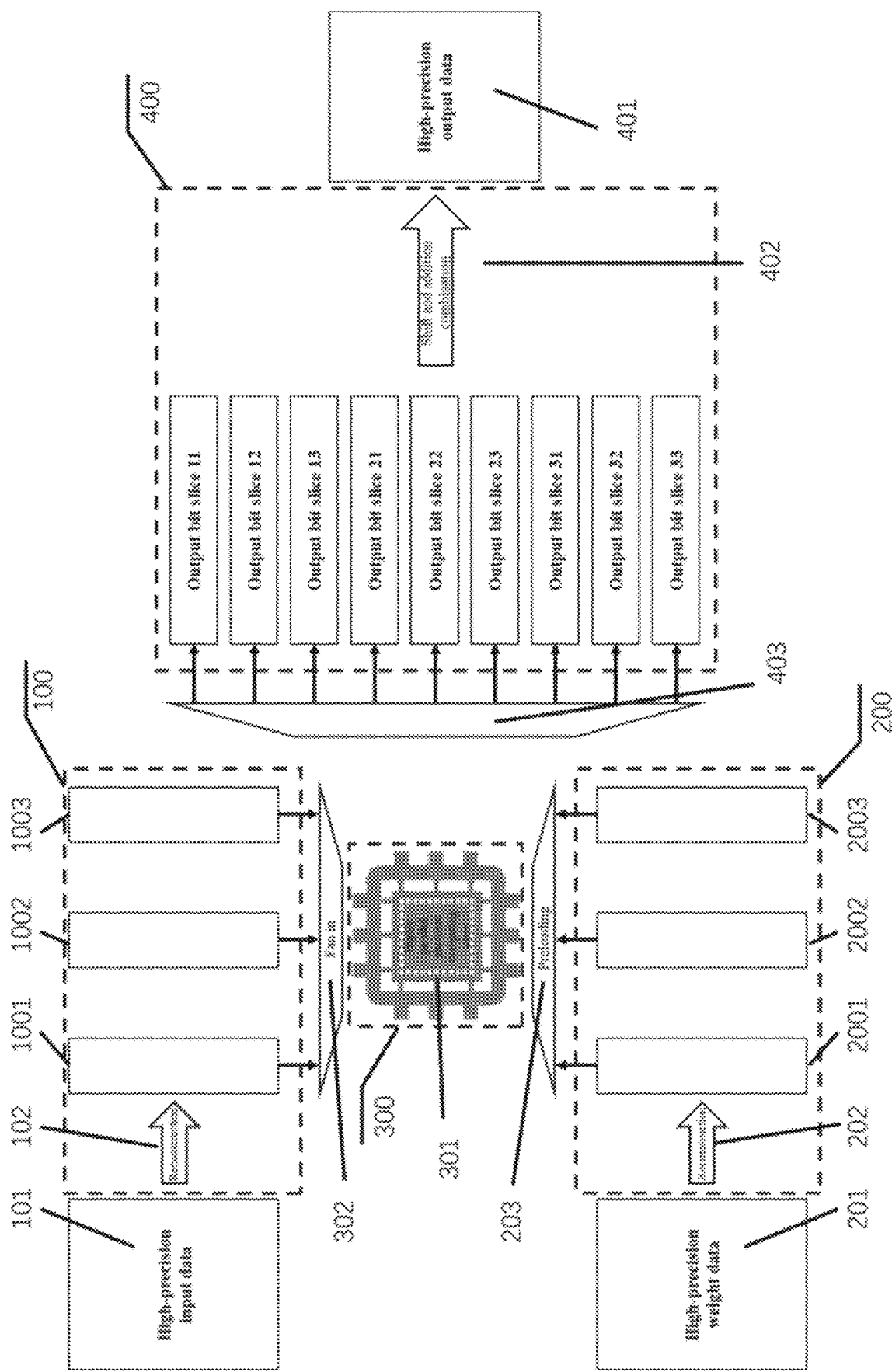
FIG. 1 shows one embodiment of the high-precision analog optical computing system based on a bit slice of the present invention. Reference numbers in FIG. 1 refer to the following: 101—high-precision input data; 102—reconstruction; 1001—input bit slice 1; 1002—input bit slice 2; 1003—input bit slice 3; 201—high-precision weight data; 202—reconstruction; 203—preloading; 2001—weight bit slice 1; 2002—weight bit slice 2; 2003—weight bit slice 3; 301—highly-concurrent photon computing core; 302—input; 401—high-precision output data; 402—shift and addition combination; 403—output.

FIG. 1 is a schematic diagram of a high-precision analog optical computing system based on bit slicing of the present invention. As shown in FIG. 1, the high-precision analog optical computing system based on bit slicing of the present invention comprises an input bit slicing reconstruction module 100, a weight bit slicing reconstruction module 200, a photon computing core module 300, and an output bit slicing combination module 400.

The input bit slice reconstruction module 100 has an electrical input port, M optical output ports, and M electro-optical converters, in this embodiment M=3.

The three optical output ports of this module are connected to the optical input ports of the photon computing core module 300. The high-precision input data flow with word length of K=6 bit is entered through the electrical input port, and it is split into 3 low-precision input bits slices with word length of 2 bit by the reconstruction algorithm. These low-precision input bits are numbered 1,2,3 in order from high to low. Then, the three electrical signals are converted into optical signals by an electro-optical converter and output to the photon computing core module 300.

The weight bit slice reconstruction module 200 has an electrical input port and M×N electrical output ports. In this embodiment, N=3.

The nine electrical output ports of this module are connected to the electrical input ports of the photon computing core module (300).

The high-precision weight with word length L=6 bit is input through the electrical input port, and the reconstruction algorithm is used to split it into 3 low-precision weight bit slices with word length 2 bit, which are 1,2,3 from high to low. Then, three copies of these low-precision weight bit slices are output to the photon computing core module 300.

Photon computing core module 300, with M optical input ports, M×N electrical input ports, M×N electrical output ports, M×N weight regulator and M×N photodetectors; That is, the embodiment has 3 optical input ports, 9 electrical input ports, 9 electrical output ports, 9 weight regulators, and 9 photodetectors. The 9 electrical input ports of this module are connected to the electrical output ports of the weight bit slicing reconstruction module 200, the 3 optical input ports of this module are connected to the optical output ports of the input bit slicing reconstruction module 100, and the 9 electrical output ports of this module are connected to the electrical input ports of the output bit slicing combination module 400.

3 input bit slices are input through the optical input port, 9 weight bit slices are input through the electrical input port, and 9 weight regulators are loaded onto the high parallel photon computing core, and 3 input bit slices are passed through 9 weight regulators to obtain 9 output bit slices. Each input bit slice and each weight bit slice will calculate an output bit slice result, numbered (m, n), that is, the result calculated by the MTH input bit slice and the NTH weight bit slice, where $1 \leq m \leq 3, 1 \leq n \leq 3$. Finally, it is converted into an electrical signal by the photodetector and then output to the output bit slice combination module 400.

The output bit slicing module 400 has 9 electrical input ports and one electrical output port. The module's nine electrical input ports are connected to the electrical output ports of the photon computing core module (300), the output bit slices numbered (m, n) are multiplied by the corresponding weight factor multiplied by $2^{(M-m)K/M+(N-n)L/N}$ and then summed to obtain a high-precision calculation result. In this embodiment, the (m, n) output bit slice is multiplied by $2^{2(6-m-n)}$, the 9 output bit slices are weighted and summed to obtain a high-precision calculation result, which is output through an electrical output port to complete the final high-precision calculation result.

Figure 2:
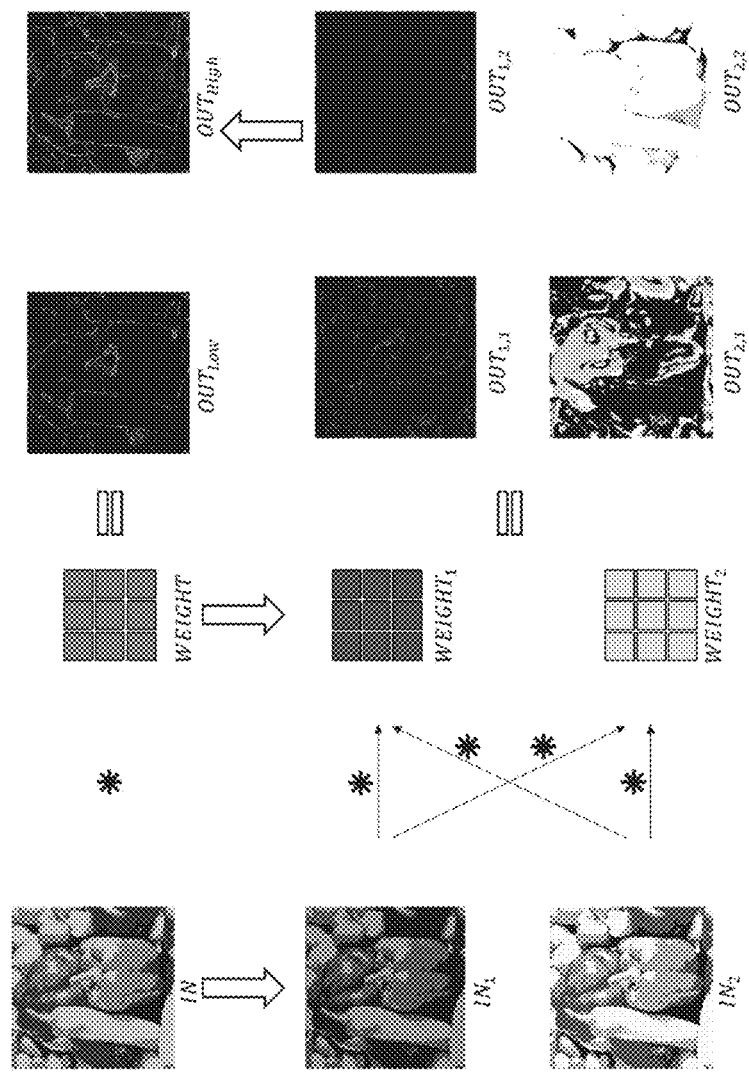
FIG. 2 shows the high-precision analog optical calculation data flow in the present invention.

Please refer to FIG. 2, which is a schematic diagram of the high-precision analog optical calculation data flow of the present invention.

Input high-precision image data IN and convolutional kernel WEIGHT to reconstruct the high and low levels respectively, namely $IN_1$, $IN_2$, $WEIGHT_1$, $WEIGHT_2$, Through the highly parallel photon computing core, Four output bit slices $OUT_{1,1}$, $OUT_{1,2}$, $OUT_{2,1}$, $OUT_{2,2}$ are obtained by the combination of input bit slices and convolution kernel bit slices. Finally, the high-precision output result $OUT_{High}$ is obtained by the shift combination, which is significantly better than the low-precision calculation result $OUT_{LOW}$.

Figure 3:
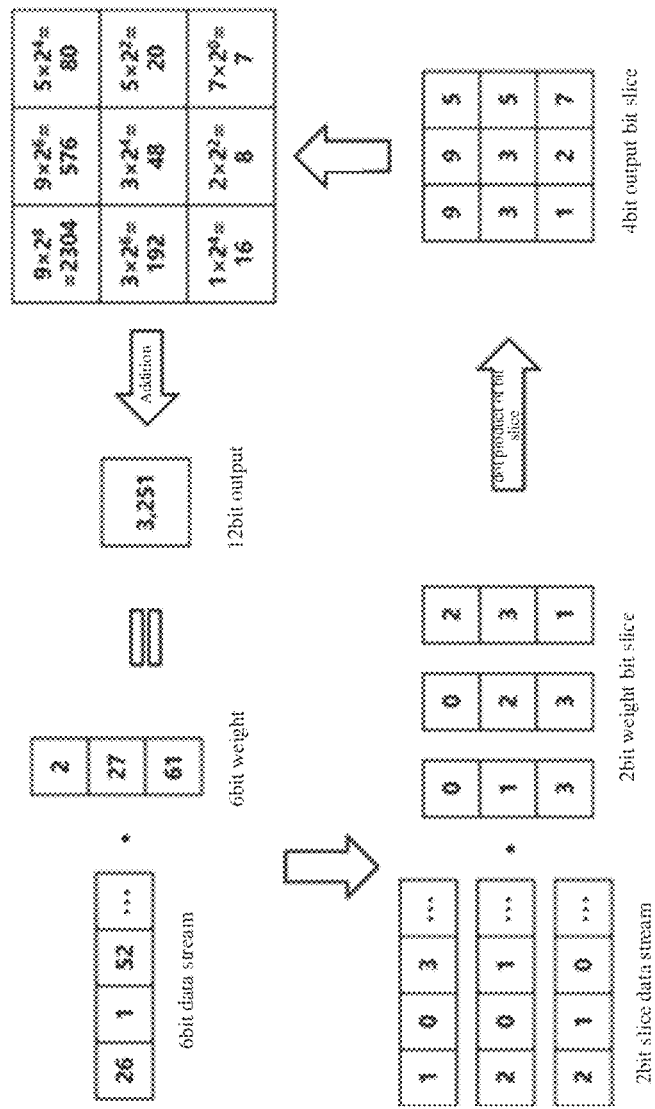
FIG. 3 shows the principle of high-precision dot product calculation in the present invention.
Figure 4:
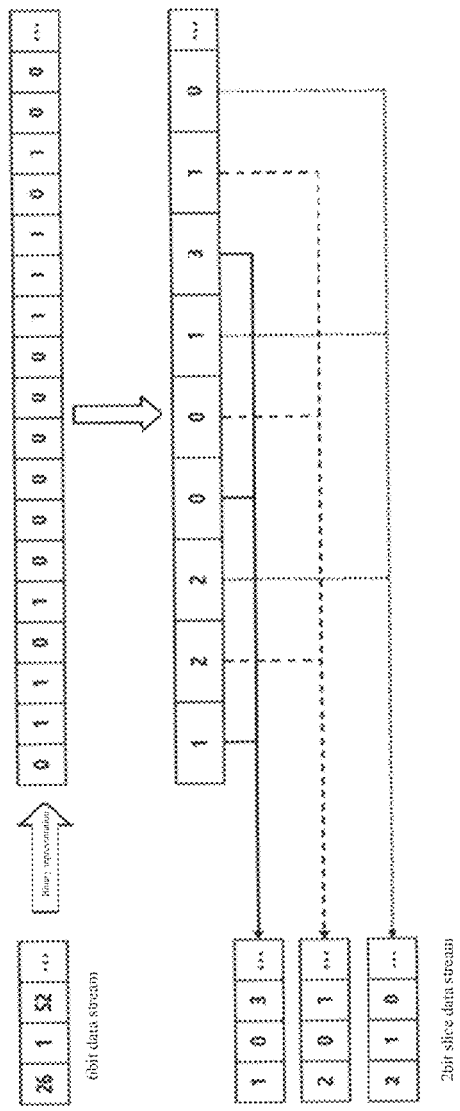
FIG. 4 shows the principle of high-precision input and weight reconstruction into bit slice in the present invention.

Please refer to FIGS. 3 and 4, FIG. 3 is the schematic diagram of the high-precision dot product calculation of the present invention, and FIG. 4 illustrates the principle of high-precision input and weight reconstruction into bit-slice.

The 6 bit input and weight data can be divided into three 2 bit input and weight slices according to the number of bits, that is, three groups of 2 bit data streams. Through the pin-two combination of bit slices, the output bit slices of 4 bit can be obtained. Then by shifting, that is, multiplying the coefficient during reconstruction, the final sum can get 12 bit high-precision output results. It can be seen that the calculation results are the same as the direct calculation of 6 bit accuracy.

The photon computing core module of the present invention uses the parallelism and high-speed transmission characteristics of photons to perform dot product calculation, that is, each weight bit slice and input bit slice are encoded as optical signals and then interact with optical elements in the photon computing core to realize dot product calculation. Due to the parallel processing capability of light, the photon computing core can process multiple data slices simultaneously, thus significantly increasing the computing speed. After calculating the dot product results of all low-precision bit slices, these results are combined by shifting and adding operations to recover the original high-precision calculation results, which are completed by the output bit slice combination module, so as to obtain the final high-precision output results. The present invention realizes high-precision analog light calculation through the reconstruction of input and weight, the efficient dot product calculation in the photon calculation core and the shift addition and combination of output results, which not only improves the accuracy and efficiency of calculation but also makes full use of the advantages of parallel processing of photons and provides a promising solution for large-scale data processing.

We claim:
1. A high-precision simulated light computing method based on bit slices, comprising the following steps:
   (1) respectively performing bit slice decomposition on an input signal and a weight signal according to predetermined precision requirements to generate a plurality of signal combinations with low bit precision, wherein each signal combination with low bit precision comprises a part of bits of the input signal or the weight signal,
   wherein the bit slice decomposition is to respectively decompose the input signal and the weight signal into a plurality of binary bit fragments, and the number of bits of each binary bit fragment is determined according to required computing precision;
   a high-precision input data stream with a word length of K bit is split into M low-precision input bit slices with word lengths of K/M bit by an input bit slice reconstruction module, wherein K is a positive integer multiple of M, and M is a positive integer greater than or equal to 2, wherein the input bit slice reconstruction module comprises one electrical input port, M optical output ports, and M electro-optical converters, wherein optical signals are converted from electrical signals of the M low-precision input bit slices by the electro-optical converters and are then outputted;
   a high-precision weight with a word length of L bit is split into N low-precision weight bit slices with word lengths of L/N bit by a weight bit slice reconstruction module, and M low-precision weight bit slices are copied and output, L is a positive integer multiple of N, and N is a positive integer greater than or equal to 2;
   (2) respectively performing independent computation on each signal combination with low bit precision generated in step (1) and the corresponding weight signal with low bit precision by using a simulated light computing technology to obtain a plurality of computation results with low precision; and
   (3) accumulating and combining, according to a predetermined weight, the plurality of computation results with low precision obtained in step (2) to generate a matrix multiplication or convolutional computation result with high precision.

2. The high-precision simulated light computing method based on bit slices of claim 1, wherein the weight bit slice reconstruction module comprises one electrical input port and M×N electrical output ports, and M copied low-precision weight bit slices are outputted by the M×N electrical output ports.

3. The high-precision simulated light computing method based on bit slices of claim 1, further comprising:
   a photon computing core module provided with M optical input ports, M×N electrical input ports, M×N electrical output ports, M×N weight regulators, and M×N photoelectrical detectors and configured to perform dot product computation on the M low-precision input bit slices and M×N low-precision weight bit slices and convert the computation results into electrical signals to be outputted by means of the photoelectrical detectors; and
   an output bit slice combination module provided with M×N electrical input ports and one electrical output port and configured to multiply M×N low-precision computation results by corresponding weights and then perform summation to obtain a high-precision computation result and output the high-precision computation result by means of the one electrical output port.

4. A high-precision simulated light computing system based on bit slices, comprising:
   an input bit slice reconstruction module provided with one electrical input port, M optical output ports, and M electro-optical converters, wherein M is a positive integer greater than or equal to 2; a high-precision input data stream with a word length of K bit being inputted via the electrical input port and being split into M low-precision input bit slices with word lengths of K/M bit by reconstruction, and optical signals being converted from M electrical signals by the electro-optical converters and being then outputted to a photon computing core module, wherein K is a positive integer multiple of M;
   a weight bit slice reconstruction module provided with one electrical input port and M×N electrical output ports, wherein N is a positive integer greater than or equal to 2; a high-precision weight with a word length of L bit being inputted by the electrical input port and being split into N low-precision weight bit slices with word lengths of L/N bit by reconstruction, and M low-precision weight bit slices being copied and then outputted to the photon computing core module, wherein L is a positive integer multiple of N;
   the photon computing core module provided with M optical input ports connected with the M optical output ports of the input bit slice reconstruction module, M×N electrical input ports connected with the M×N electrical output ports of the weight bit slice reconstruction module, M×N electrical output ports, M×N weight regulators, and M×N photoelectrical detectors; M×N weight bit slices being loaded to a highly-concurrent photon computing core by the M×N weight regulators and being computed with M input bit slices to obtain M×N output bit slice results, and the output bit slice results being converted into electrical signals by the M×N photoelectrical detectors and being outputted as output bit slices to an output bit slice combination module; and the output bit slice combination module provided with M×N electrical input ports connected with the M×N electrical output ports of the photon computing core module and one electrical output port; each input bit slice and each weight bit slice being computed to obtain an output bit slice result with a serial number (m, n), i.e., a result computed from the mth input bit slice and the nth weight bit slice, wherein $1 \le m \le M$, and $1 \le n \le N$; an output bit slice with the serial number (m, n) being multiplied by a corresponding weight coefficient $2(M-m)K/M+(N-n)L/N$, then, M×N output bit slices being summated to obtain a high-precision computation result, and the high-precision computation result being outputted via the one electrical output port.

5. The high-precision simulated light computing system based on bit slices of claim 4, wherein the electro-optical converters in the input bit slice reconstruction module are coherent modulators working in a mode of zero bias point and linearly modulating an input electrical signal to an optical amplitude, and a value of the signal is represented by an amplitude value of light.

6. The high-precision simulated light computing system based on bit slices of claim 4, wherein reconstruction ways in the input bit slice reconstruction module and the weight bit slice reconstruction module are implemented by a single chip microcomputer or a digital computer.

7. The high-precision simulated light computing system based on bit slices of claim 4, wherein the photon computing core module adopts an on-chip coherent light computing architecture, an on-chip noncoherent light computing architecture, and a spatial diffraction light computing architecture; or adopts different time, different space, different modes and different wavelengths so as to implement the operation of different signals and weights.

* * * * *